US012440155B2

(12) United States Patent
Ariyama et al.

(10) Patent No.: US 12,440,155 B2
(45) Date of Patent: Oct. 14, 2025

(54) PHYSIOLOGICAL INFORMATION PROCESSING METHOD, PHYSIOLOGICAL INFORMATION PROCESSING DEVICE, AND PHYSIOLOGICAL INFORMATION PROCESSING SYSTEM

(71) Applicant: NIHON KOHDEN CORPORATION, Tokyo (JP)

(72) Inventors: Tetsuri Ariyama, Tokorozawa (JP); Kenji Ohara, Tokorozawa (JP); Minoru Matsushima, Tokorozawa (JP); Hideki Ochiai, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 586 days.

(21) Appl. No.: 17/806,775

(22) Filed: Jun. 14, 2022

(65) Prior Publication Data
US 2022/0409129 A1    Dec. 29, 2022

(30) Foreign Application Priority Data
Jun. 28, 2021   (JP)  ................................ 2021-106755

(51) Int. Cl.
*A61B 5/00*       (2006.01)
*G16H 20/70*       (2018.01)
(Continued)

(52) U.S. Cl.
CPC .......... *A61B 5/4884* (2013.01); *A61B 5/7296* (2013.01); *G16H 20/70* (2018.01); *G16H 40/67* (2018.01); *G16H 50/30* (2018.01)

(58) Field of Classification Search
None
See application file for complete search history.

(56) References Cited

U.S. PATENT DOCUMENTS 8,267,862 B2 *  9/2012  Jeong ................. A61B 5/02055
                                                                   600/595
8,484,048 B2 *  7/2013  Halsted .................. G16H 40/63
                                                                   705/3
(Continued)

FOREIGN PATENT DOCUMENTS

JP     2015054002 A     3/2015
JP     2019004924 A     1/2019
(Continued)

OTHER PUBLICATIONS

Garcia-Ceja et al., Automatic Stress Detection in Working Environments From Smartphones' Accelerometer Data: A First Step, IEEE Journal of Biomedical and Health Informatics, vol. 20, No. 4, Jul. 2016 (Year: 2016).*
(Continued)

*Primary Examiner* — Carl H Layno
*Assistant Examiner* — Manolis Pahakis
(74) *Attorney, Agent, or Firm* — McDonald Hopkins LLC (57) ABSTRACT

A physiological information processing method executed by a computer. The computer can obtain a stress index parameter that indicates a stress index of a subject based on physiological information data. The computer can also compare the stress index parameter with a predetermined threshold value and determine whether the subject is stressed based on the comparison between the stress index parameter and the predetermined threshold value. Additionally, the computer can output stress information indicating that the subject is stressed.

17 Claims, 7 Drawing Sheets

(51) Int. Cl.
*G16H 40/67* (2018.01)
*G16H 50/30* (2018.01)

(56) References Cited

U.S. PATENT DOCUMENTS

| | | | |
|---|---|---|---|
| 11,331,508 B1* | 5/2022 | Cowan | A61B 5/6805 |
| 12,114,986 B2* | 10/2024 | Grantcharov | A61B 5/02405 |
| 2008/0082011 A1* | 4/2008 | Chen | G06F 3/042 |
| | | | 600/502 |
| 2009/0231124 A1* | 9/2009 | Klabunde | G16H 40/20 |
| | | | 340/539.12 |
| 2012/0029300 A1* | 2/2012 | Paquet | A61B 5/6833 |
| | | | 600/300 |
| 2012/0059911 A1* | 3/2012 | Randhawa | G16H 40/67 |
| | | | 709/219 |
| 2013/0225950 A1* | 8/2013 | Van Elswijk | G16H 10/20 |
| | | | 600/309 |
| 2015/0265212 A1* | 9/2015 | Bruekers | A61B 5/486 |
| | | | 600/595 |
| 2015/0271329 A1* | 9/2015 | Deshmukh | G16H 40/67 |
| | | | 379/265.06 |
| 2016/0157776 A1* | 6/2016 | Mestha | A61B 5/02438 |
| | | | 600/479 |
| 2016/0213296 A1* | 7/2016 | Kikuchi | A61B 5/165 |
| 2016/0232317 A1* | 8/2016 | Kim | A61B 5/024 |
| 2017/0000398 A1* | 1/2017 | Ouwerkerk | A61B 5/7239 |
| 2017/0011210 A1* | 1/2017 | Cheong | A61B 5/681 |
| 2017/0068790 A1* | 3/2017 | Fuerst | G16H 50/30 |
| 2017/0224244 A1* | 8/2017 | Kuwabara | A61B 5/6804 |
| 2017/0331505 A1* | 11/2017 | Shim | G04G 9/0064 |
| 2019/0232047 A1* | 8/2019 | Chu | A61H 23/00 |
| 2019/0239791 A1* | 8/2019 | Beck | A61B 5/163 |
| 2019/0344090 A1* | 11/2019 | Sullivan | A61B 5/0816 |
| 2020/0268299 A1* | 8/2020 | Kobayashi | A61B 5/486 |
| 2021/0000355 A1* | 1/2021 | Zukawa | A61B 5/0537 |
| 2021/0077031 A1* | 3/2021 | Fukunaga | G06F 3/015 |
| 2021/0151179 A1* | 5/2021 | Borthakur | A61B 5/7275 |

FOREIGN PATENT DOCUMENTS

| | | |
|---|---|---|
| JP | 2019096116 A | 6/2019 |
| JP | 2019209128 A | 12/2019 |
| JP | 2020130784 A | 8/2020 |
| JP | 2020-146345 A | 9/2020 |
| WO | WO-2019230235 A1 * 12/2019 | A61B 5/01 |

OTHER PUBLICATIONS

Office action in corresponding JP Application No. 2021-106755, dated Nov. 19, 2024.

* cited by examiner

PHYSIOLOGICAL INFORMATION PROCESSING METHOD, PHYSIOLOGICAL INFORMATION PROCESSING DEVICE, AND PHYSIOLOGICAL INFORMATION PROCESSING SYSTEM

CROSS-REFERENCE TO RELATED APPLICATIONS

This application is based on and claims priority under 35 USC 119 from Japanese Patent Application No. 2021-106755 filed on Jun. 28, 2021, the contents of which are incorporated herein by reference.

TECHNICAL FIELD

The present disclosure relates to a physiological information processing method, a physiological information processing device, and a physiological information processing system. Further, the present disclosure relates to a computer-readable storage medium storing a program configured to cause a computer to execute the physiological information processing method.

BACKGROUND ART

Patent Literature 1 (JP-A-2020-146345) discloses a technique of quantifying emotion of a patient based on face image data of an outpatient and transmitting information indicating the quantified emotion of the patient.

However, due to a recent pandemic of a new coronavirus (COVID-19), an outpatient usually wears a mask in a hospital. Therefore, since a mouth of the patient is hidden in face image data of the patient wearing the mask, it is difficult to accurately obtain information indicating emotion of the patient.

Incidentally, from the viewpoint of improving quality of medical services, there is a need for a medical worker to grasp in advance whether an outpatient is stressed before an examination.

For example, if a medical worker who is scheduled to examine a patient knows in advance that the patient is stressed (that is, a mental status of the patient is not stable), the medical worker can determine that it is better to refrain from words and actions that arouse anxiety of the patient during an examination.

An object of the present disclosure is to provide a physiological information processing method, a physiological information processing device, and a physiological information processing system capable of grasping in advance that a subject is stressed before an examination.

SUMMARY OF INVENTION

A physiological information processing method according to a first aspect of the present disclosure includes: obtaining a stress index parameter indicating a stress index of a subject based on physiological information data of the subject; comparing the stress index parameter with a predetermined threshold value; determining that the subject is stressed in accordance with the comparison between the stress index parameter and the predetermined threshold value; and outputting stress information indicating that the subject is stressed.

A computer-readable non-transitory storage medium storing a program for causing a computer to execute the physiological information processing method is stored is also provided.

A physiological information processing system according to a second aspect of the present disclosure includes: a physiological information processing device that is attached to a subject and configured to obtain physiological information data of the subject; a server communicably connected to the physiological information processing device; and an information terminal that is communicably connected to the server and associated with a medical worker who examines the subject, wherein the physiological information processing system is configured to: obtain a stress index parameter indicating a stress index of the subject based on the physiological information data of the subject; compare the stress index parameter with a predetermined threshold value; determine that the subject is stressed in accordance with the comparison between the stress index parameter and the predetermined threshold value; transmit stress information indicating that the subject is stressed to the information terminal; and present the stress information to the medical worker visually, audibly, or tactually.

A physiological information processing device according to a third aspect of the present disclosure includes: one or more processors; one or more memories configured to store a computer readable instruction; and a wireless communication module, wherein when the computer readable instruction is executed by the one or more processors, the physiological information processing device is configured to: obtain a stress index parameter indicating a stress index of a subject based on the physiological information data of the subject; compare the stress index parameter with a predetermined threshold value; determine that the subject is stressed in accordance with the comparison between the stress index parameter and the predetermined threshold value; and transmit stress information indicating that the subject is stressed to an outside through the wireless communication module.

BRIEF DESCRIPTION OF DRAWINGS

Exemplary embodiments of the present invention will be described in detail based on the following figures, wherein.

DESCRIPTION OF EMBODIMENTS

Figure 1:
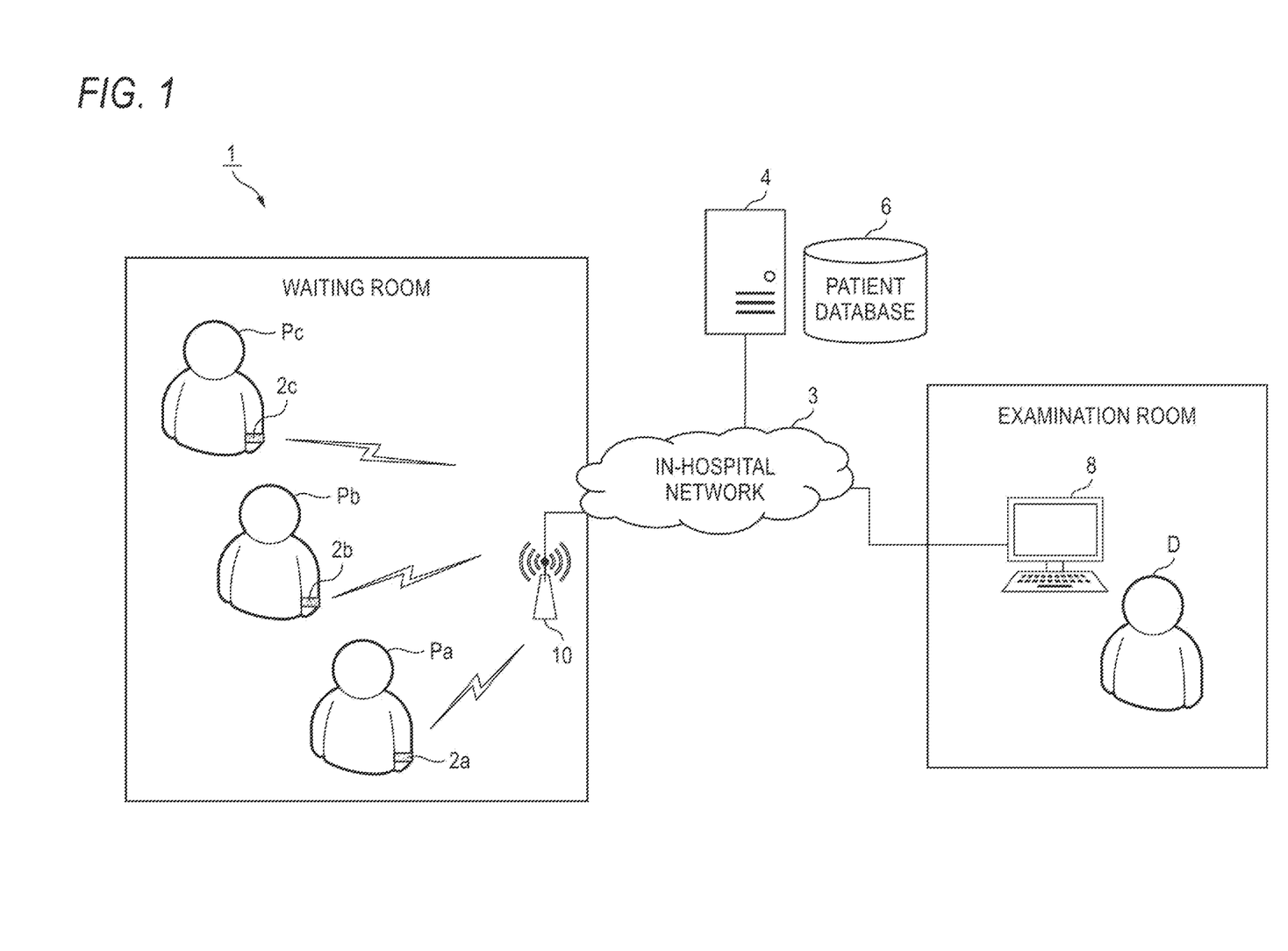
FIG. 1 is a schematic diagram illustrating an example of a physiological information processing system according to an embodiment of the present disclosure.

Hereinafter, an embodiment will be described with reference to the drawings. First, a physiological information processing system 1 (hereinafter, simply referred to as the processing system 1) according to the embodiment of the present disclosure (hereinafter, simply referred to as the present embodiment) will be described below with reference to FIG. 1. FIG. 1 is a schematic diagram illustrating an example of the processing system 1 according to the present embodiment.

As illustrated in FIG. 1, the processing system 1 is a communication system constructed in a hospital, and can include a plurality of physiological information processing devices 2a to 2c, a server 4, and an information terminal 8. In the following description, the physiological information processing devices 2a to 2c are simply referred to as the processing devices 2a to 2c. Further, for convenience of description, the processing devices 2a to 2c may be collectively referred to as a processing device 2.

In this example, it is assumed that three outpatients (subjects) Pa to Pc stand by in a waiting room of the hospital. It is assumed that the patients Pa to Pc receive distribution of the processing devices 2a to 2c distributed by medical staff at a reception window at the time of reception. In this way, it is assumed that the patient Pa is wearing the processing device 2a during a waiting time before an examination. It is assumed that the patient Pb is wearing the processing device 2b during the waiting time before the examination. It is assumed that the patient Pc is wearing the processing device 2c during the waiting time before the examination. Hereinafter, the patients Pa to Pc may be simply referred to as a patient P.

The processing device 2 is a medical wearable device attached to a part of a body of the patient P (subject), and is configured to obtain physiological information data of the patient P. The processing device 2 has a wireless communication function and is connected to an in-hospital network 3 via a wireless access point 10 installed in the waiting room. The processing device 2 can obtain the physiological information data and stress information to be described later of the patient P, and then transmit the physiological information data and the stress information of the patient P to the server 4 through the in-hospital network 3.

Figure 2:
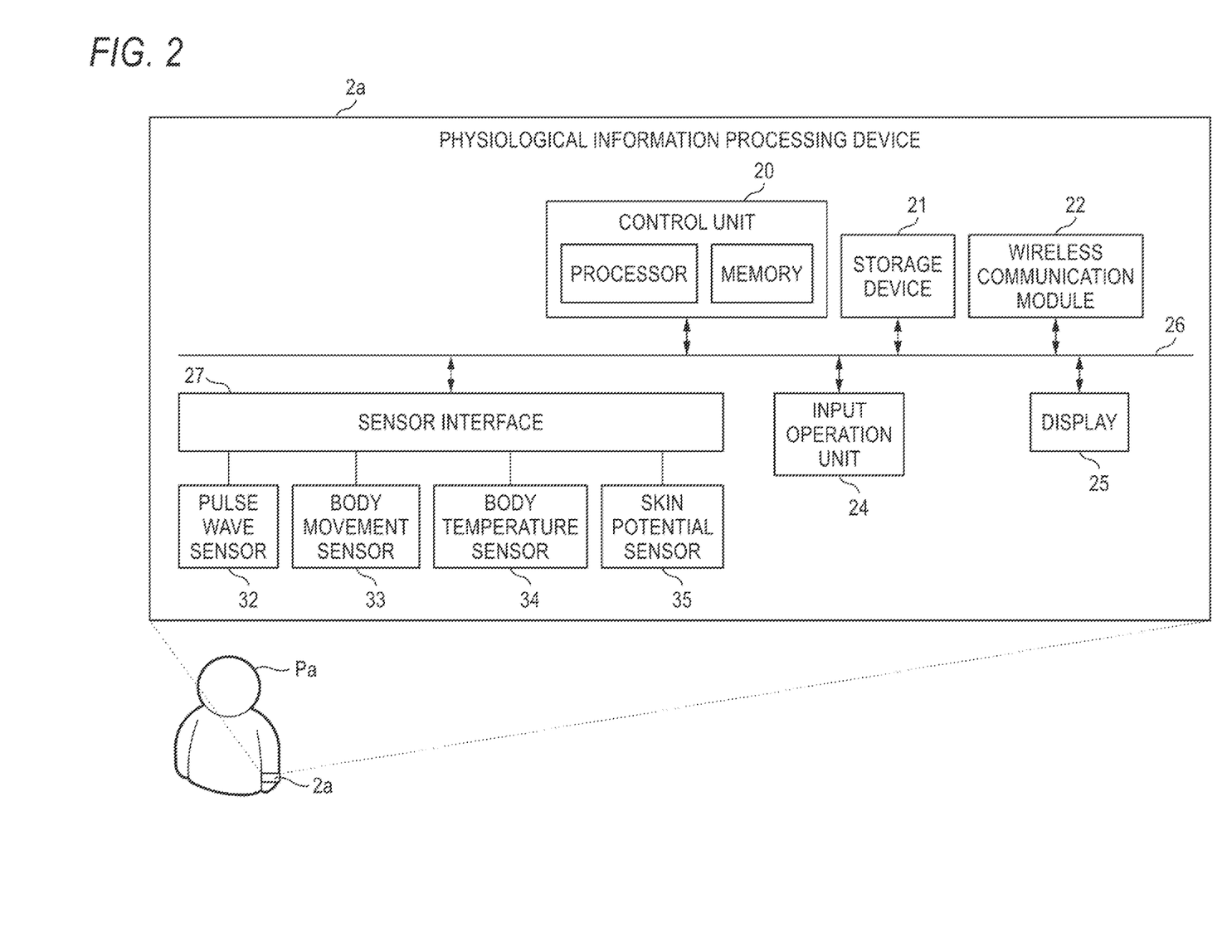
FIG. 2 illustrates an example of a hardware configuration of a physiological information processing device according to the embodiment of the present disclosure.

Next, a hardware configuration of the processing device 2a will be described with reference to FIG. 2. FIG. 2 illustrates an example of the hardware configuration of the processing device 2a according to the present embodiment. In the present embodiment, the processing devices 2a to 2c have the same configuration.

As illustrated in FIG. 2, the processing device 2a can include a control unit 20, a storage device 21, a wireless communication module 22, a display 25, an input operation unit 24, and a sensor interface 27. Such components are connected to each other via a bus 26 so as to be capable of communicating with each other.

The control unit 20 can include one or more memories and one or more processors. Each of the one or more memories is configured to store a computer readable command (program). For example, the one or more memories may each include a read-only memory (ROM) where various programs and the like are stored, a random access memory (RAM) including a plurality of work areas where various programs and the like executed by the one or more processors are stored, and the like. Each of the one or more processors is constituted by, for example, at least one of a central processing unit (CPU), a micro processing unit (MPU), and a graphics processing unit (GPU). The CPU may include a plurality of CPU cores. The GPU may include a plurality of GPU cores. The one or more processors may each be configured to load a program specified from various programs incorporated in the storage device 21 or the ROM onto the RAM and execute various processes in cooperation with the RAM.

The one or more processors may each load a physiological information processing program to be described later onto the RAM and execute the program in cooperation with the RAM such that the control unit 20 may control various operations of the processing device 2. Details of the physiological information processing program will be described later.

The storage device 21 is, for example, a storage device such as a flash memory, and is configured to store programs and various types of data. The physiological information processing program may be incorporated in the storage device 21. In addition, physiological information data such as pulse wave data, body movement data, body temperature data, and skin potential data of the patient Pa may be stored in the storage device 21. For example, pulse wave data obtained by a pulse wave sensor 32 may be stored in the storage device 21 via the sensor interface 27.

The wireless communication module 22 is configured to connect the processing device 2 to the in-hospital network 3. The wireless communication module 22 may include an RF circuit and a transmission and reception antenna configured to perform wireless communication with the wireless access point 10. A short-range wireless communication standard between the wireless access point 10 and the processing device 2 is, for example, Wi-Fi (registered trademark) or Bluetooth (registered trademark). The in-hospital network 3 is constructed by a local area network (LAN) or a wide area network (WAN).

The display 25 is configured to display the physiological information data of the patient Pa obtained in real time, and can include, for example, a liquid crystal panel or an organic EL panel. The input operation unit 24 is configured to receive an input operation of the patient Pa and generate an instruction signal corresponding to the input operation. The input operation unit 24 is, for example, a touch panel overlaid on the display 25, an operation button installed on a housing of the processing device 2, or the like. After the instruction signal generated by the input operation unit 24 is transmitted to the control unit 20 via the bus 26, the control unit 20 executes a predetermined operation in accordance with the instruction signal.

The sensor interface 27 is an interface configured to communicably connect physiological information sensors such as the pulse wave sensor 32, a body movement sensor 33, a body temperature sensor 34, and a skin potential sensor 35 to the processing device 2. The sensor interface 27 may include an input terminal to which physiological information data output from these physiological information sensors is input. The input terminal may be physically connected to a connector of each physiological information sensor. The sensor interface 27 may also include a wireless communication circuit, an antenna, and the like so as to perform wireless communication with these physiological information sensors. The sensor interface 27 may also include an analog processing circuit (for example, a filter processing circuit, a signal amplification circuit, an AD converter, or the like) configured to process a signal output from each physiological information sensor. In this way, an analog signal output from the physiological information sensor may be converted into a digital signal by the sensor interface 27.

The processing device 2 may further have the pulse wave sensor 32, the body movement sensor 33, the body temperature sensor 34, and the skin potential sensor 35 as the physiological information sensors. The pulse wave sensor 32 (for example, a SpO2 sensor) is configured to obtain pulse wave data indicating change over time in a pulse wave of the patient Pa. The body movement sensor 33 is, for example, an acceleration sensor, and is configured to obtain body movement data indicating change over time in body movement of the patient Pa. The body temperature sensor 34 is configured to obtain body temperature data indicating change over time in body temperature of the patient Pa. The skin potential sensor 35 is configured to obtain skin potential data indicating change over time in a skin potential of the patient Pa.

Although the four physiological information sensors are provided in the processing device 2 in the example of the processing device 2 illustrated in FIG. 2, at least one of the pulse wave sensor 32, the body movement sensor 33, the body temperature sensor 34, and the skin potential sensor 35 may be provided in the processing device 2. For example, when the stress information of the patient Pa to be described later is calculated from the pulse wave data, only the pulse wave sensor 32 may be provided in the processing device 2.

Figure 3:
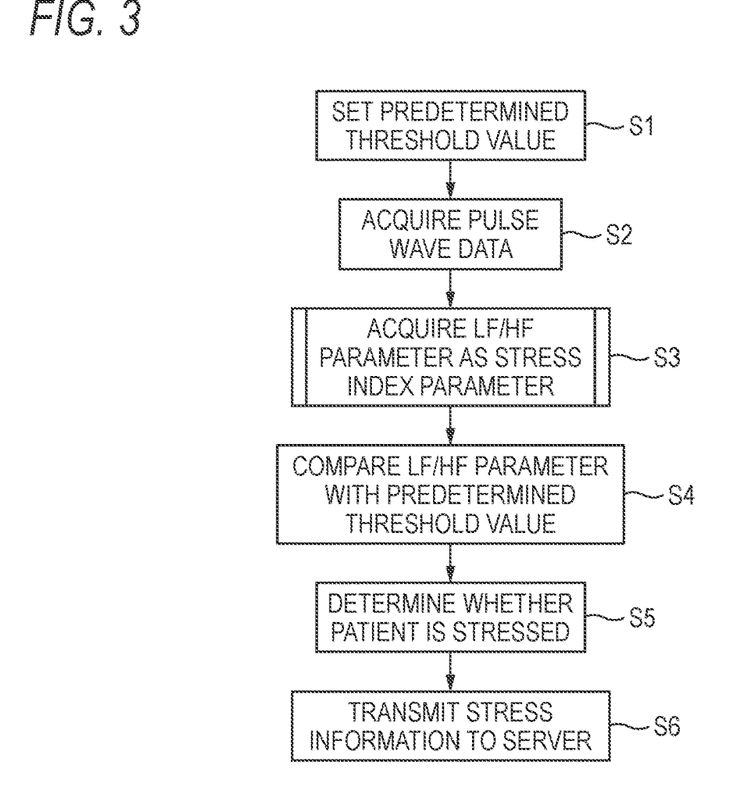
FIG. 3 is a flowchart illustrating a series of processes for generating stress information of a patient from pulse wave data of the patient.
Figure 4:
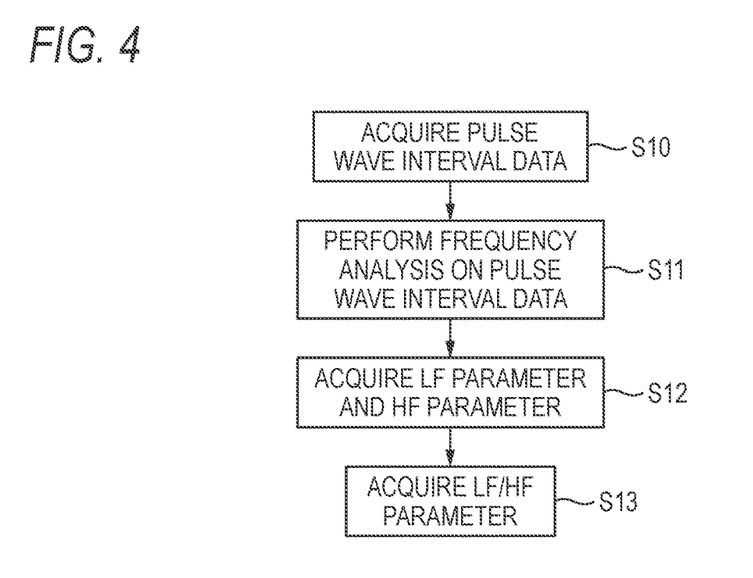
FIG. 4 is a flowchart illustrating a series of processes for obtaining an LF/HF parameter.

Next, a series of processes for generating the stress information of the patient Pa from the pulse wave data of the patient Pa will be described below with reference to FIGS. 3 and 4. FIG. 3 is a flowchart illustrating the series of processes for generating the stress information of the patient Pa from the pulse wave data of the patient Pa. FIG. 4 is a flowchart illustrating a series of processes for obtaining an LF/HF parameter. It is assumed that the series of processes illustrated in FIGS. 3 and 4 are executed by the processing device 2a. Meanwhile, it is assumed that the processing devices 2b and 2c also execute the same processes as the processes executed by the processing device 2a.

As illustrated in FIG. 3, in step S1, the control unit 20 of the processing device 2a sets a predetermined threshold value of the LF/HF parameter. Here, the predetermined threshold value is a value used as a comparison target when determining whether the patient Pa is stressed based on the LF/HF parameter. The control unit 20 may set the predetermined threshold value of the LF/HF parameter based on attribute information of the patient Pa. The attribute information of the patient Pa can include, for example, at least one of sex, age, past medical history, height, weight, blood type, life history, current medical history, and race of the patient Pa.

The attribute information of the patient Pa may be stored in, for example, a patient database 6 provided in the server 4. After receiving the attribute information of the patient Pa from the server 4 via the in-hospital network 3, the processing device 2a may determine the predetermined threshold value based on the attribute information of the patient Pa and table data in which the attribute information of the patient and the predetermined threshold value are associated with each other. For example, in a case where the attribute information such as sex, age, past medical history, and the like of the patient and the predetermined threshold value are associated with each other in the table data, the control unit 20 can set the predetermined threshold value based on the attribute information of the patient by referring to the table data stored in the storage device 21.

Although the control unit 20 sets the predetermined threshold value based on the attribute information of the patient Pa in this example, the server 4, instead of the processing device 2, may set the predetermined threshold value based on the attribute information of the patient Pa based on the table data and then transmit the predetermined threshold value to the processing device 2.

Next, in step S2, the control unit 20 obtains the pulse wave data of the patient Pa from the pulse wave sensor 32. Next, the control unit 20 obtains the LF/HF parameter as a stress index parameter (step S3).

Here, the series of processes for obtaining the LF/HF parameter illustrated in step S3 will be described below with reference to FIG. 4. As illustrated in FIG. 4, in step S10, the control unit 20 obtains, from the pulse wave data, pulse wave interval data indicating an interval between pulse waves adjacent to each other in time. Here, the pulse wave interval data is data indicating pulse rate variability (PRV). The pulse wave interval data can include a plurality of pulse wave intervals. Each pulse wave interval indicates a time interval between a minimum point of one of the pulse waves adjacent to each other in time and a minimum point of the other pulse wave.

Next, in step S11, the control unit 20 performs frequency analysis (for example, wavelet analysis, fast Fourier transform (FFT), or the like) on the pulse wave interval data including the plurality of pulse wave intervals. Next, the control unit 20 specifies peak intensity or an integrated value of intensity of a power spectrum of the pulse wave interval data in a low frequency band (for example, 0.05 Hz to 0.15 Hz) of the pulse wave interval data as a parameter related to a low frequency component (LF) of the pulse wave interval data (hereinafter, referred to as an LF parameter). In addition, the control unit 20 specifies peak intensity or an integrated value of intensity of a power spectrum of the pulse wave interval data in a high frequency band (for example, 0.15 Hz to 0.40 Hz) of the pulse wave interval data as a parameter related to a high frequency component (HF) of the pulse wave interval data (hereinafter, referred to as an HF parameter).

Next, in step S13, the control unit 20 obtains the LF/HF parameter based on the LF parameter and the HF parameter. The LF/HF parameter is calculated by the following formula (1).

$$\text{LF/HF parameter} = \text{LF parameter} / \text{HF parameter} \quad (1)$$

The LF/HF parameter is an example of an autonomic nervous parameter related to an autonomic nerve of the patient Pa. Since the LF/HF parameter indicates a state of the autonomic nerve of the patient Pa, it is possible to determine a stress state of the patient Pa based on the LF/HF parameter.

Referring back to FIG. 3, in step S4, the control unit 20 compares the obtained LF/HF parameter with the predetermined threshold value. Next, the control unit 20 determines whether the patient Pa is stressed in accordance with the comparison between the LF/HF parameter and the predetermined threshold value (step S5). In particular, the control unit 20 determines whether the patient Pa is stressed depending on whether the LF/HF parameter is equal to or higher than the predetermined threshold value. Here, the LF/HF parameter increases when the patient is stressed, whereas the LF/HF parameter decreases when the patient is relaxed. In this way, when the LF/HF parameter is equal to or higher than the predetermined threshold value, the control unit 20 determines that the patient Pa is stressed. On the other hand, when the LF/HF parameter is smaller than the predetermined threshold value, the control unit 20 determines that the patient Pa is not stressed. The term that the patient is stressed means that the patient has a predetermined level or more stress.

Next, in step S6, the control unit 20 transmits the stress information on the stress state of the patient Pa to the server 4 via the in-hospital network 3. In particular, when it is determined that the patient Pa is stressed, the control unit 20 transmits the stress information indicating that the patient Pa is stressed to the server 4. On the other hand, when it is determined that the patient Pa is not stressed, the control unit 20 may transmit the stress information indicating that the patient Pa is not stressed to the server 4. When the patient Pa is not stressed, the stress information may also not be transmitted to the server 4.

Figure 5:
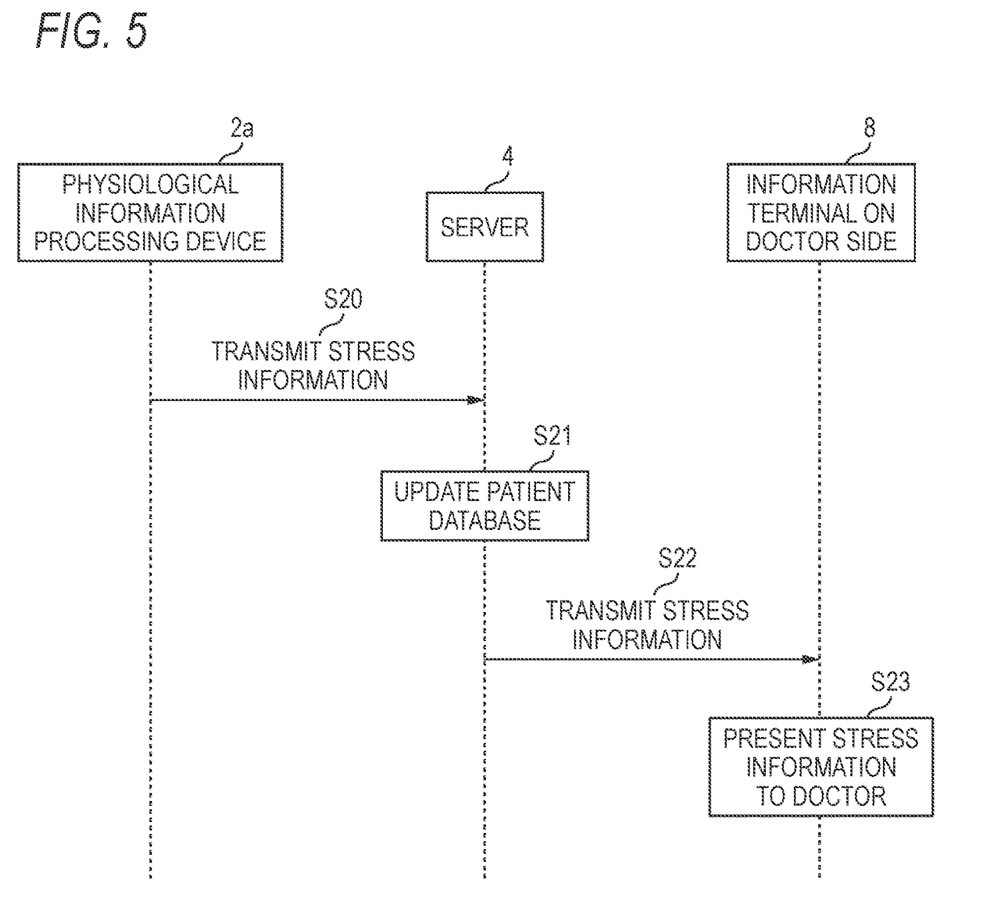
FIG. 5 is a sequence diagram illustrating a series of processes for presenting the stress information generated by the physiological information processing device to a doctor.

Next, a series of flows until the stress information generated by the processing device 2a is presented to a doctor D (an example of a medical worker) in an examination room will be described below with reference to FIGS. 1 and 5. FIG. 5 is a sequence diagram illustrating the series of processes for presenting the stress information generated by the processing device 2a to the doctor D (see FIG. 1).

As illustrated in FIG. 5, in step S20, the processing device 2a transmits the stress information of the patient Pa to the server 4 via the in-hospital network 3. Here, the processing device 2a may transmit the physiological information data of the patient Pa including the LF/HF parameter to the server 4 together with the stress information. Next, the server 4 updates the patient database 6 based on the received stress information of the patient Pa (step S21). Specifically, the server 4 updates the information on the patient Pa included in the patient database 6 based on the stress information of the patient Pa. Next, the server 4 transmits the stress information to the information terminal 8 via the in-hospital network 3 (step S22).

The information terminal 8 is an information terminal operated by the doctor D in charge of the examination of the patient Pa. That is, the information terminal 8 is an information terminal associated with the doctor D. The information terminal 8 is communicably connected to the server 4 via the in-hospital network 3. A type of the information terminal 8 is not particularly limited. For example, the information terminal 8 may be a stationary information terminal or a portable information terminal.

In the process of step S22, the server 4 may specify the information terminal 8 associated with the doctor D in charge of the patient Pa by referring to the patient database 6, and then transmit the stress information to the specified information terminal 8. In addition, when the information terminal 8 transmits a transmission request of information on the patient Pa to the server 4, the server 4 transmits the information on the patient Pa including the stress information to the information terminal 8 in response to the transmission request from the information terminal 8.

Next, in step S23, the information terminal 8 receives the stress information of the patient Pa from the server 4, and then visually, audibly, or tactually presents the stress information to the doctor D (step S23). For example, when the stress information of the patient Pa is visually presented to the doctor D, the stress information may be displayed on a display of the information terminal 8. When the stress information of the patient Pa is audibly presented to the doctor D, the stress information may be output as voice information through a speaker of the information terminal 8. When the stress information of the patient Pa is tactually presented to the doctor D, the stress information may be output through a vibration mechanism connected to the information terminal 8. For example, when the patient Pa is stressed, the stress information may be presented to the doctor D by vibration of the vibration mechanism.

In this way, according to the present embodiment, the doctor D who is scheduled to examine the patient Pa can grasp in advance that the patient Pa is stressed before the examination of the patient Pa. In this way, the doctor D can provide the patient Pa with an optimal medical service in consideration of a mental status of the patient Pa. For example, if the doctor D knows in advance that the patient Pa is stressed (that is, the mental status of the patient Pa is not stable), the doctor D can determine that it is better to refrain from words and actions that arouse anxiety of the patient Pa during the examination.

In the present embodiment, the processing device 2a also has the wireless communication function. The stress information is finally transmitted from the wireless communication module 22 to the information terminal 8 associated with the doctor D through the in-hospital network 3. In this way, the doctor D who is scheduled to examine the patient Pa can know in advance that the patient Pa is stressed, without being known to the patient Pa.

Although the stress information of the patient Pa is transmitted to the information terminal 8 of the doctor D via the server 4 in the present embodiment, the present embodiment is not limited thereto. For example, the stress information of the patient Pa may be directly transmitted to the information terminal 8 without passing through the server 4. In this case, the processing device 2a may obtain information on a network address of the information terminal 8 from the server 4 before transmitting the stress information to the information terminal 8.

In addition, although the series of processes illustrated in FIG. 3 are executed by the processing device 2a in the present embodiment, the processes of steps S1 to S5 illustrated in FIG. 3 may be executed by the server 4 instead of the processing device 2a. For example, the server 4 may obtain the pulse wave data of the patient Pa from the processing device 2a via the in-hospital network 3 after setting the predetermined threshold value in step S1 (step S2). Thereafter, the server 4 may transmit the stress information of the patient Pa to the information terminal 8 via the in-hospital network 3 after executing the processes of steps S3 to S5.

In addition, although the predetermined threshold value of the LF/HF parameter is set based on the attribute information of the patient Pa in the present embodiment, the present embodiment is not limited thereto. For example, a value of the LF/HF parameter measured when the patient Pa visited the hospital previously may be set as the predetermined threshold value. In this regard, a value of the LF/HF parameter measured when the patient Pa visited the hospital last time may be set as the predetermined threshold value. In this case, the processing device 2a may obtain the value of the LF/HF parameter of the patient Pa of the previous visit from the server 4, and then set the value of the LF/HF parameter of the patient Pa of the previous visit as the predetermined threshold value of the LF/HF parameter.

In addition to or instead of the value of the LF/HF parameter measured from the patient Pa, whether the patient Pa is stressed may also be determined based on a fluctuation value of a heart rate estimated from electrocardiogram data, a fluctuation value of a pulse rate or a respiratory rate calculated by estimation from the pulse wave data. In this case, the fluctuation value of the heart rate or the fluctuation value of the pulse rate or the respiratory rate is used as the stress index parameter.

In addition, although the LF/HF parameter is obtained based on the pulse wave data after the pulse wave data is obtained from the pulse wave sensor 32 attached to the patient Pa in the present embodiment, the present embodiment is not limited thereto. For example, the LF/HF parameter may also be obtained based on electrocardiogram data obtained by an electrocardiogram sensor instead of the pulse wave sensor 32. In this case, the control unit 20 obtains RR interval data including a plurality of RR intervals from the electrocardiogram data, and then performs frequency analysis on the obtained RR interval data. Thereafter, the control unit 20 specifies peak intensity or an integrated value of intensity of a power spectrum of the RR interval data in a low frequency band of the RR interval data as the LF parameter related to a low frequency component (LF) of the RR interval data. In addition, the control unit 20 specifies peak intensity or an integrated value of intensity of a power spectrum of the RR interval data in a high frequency band of the RR interval data as the HF parameter related to a high frequency component (HF) of the RR interval data.

In addition, in the present embodiment, the number of times of acquisition of the LF/HF parameter is not particularly limited. For example, the LF/HF parameter may be updated every 20 seconds during a measurement period of 10 minutes. In this case, the LF/HF parameter is obtained 30 times in the measurement period of 10 minutes. Here, in a case where the comparison process of step S4 illustrated in FIG. 2 is executed only once, an average value of the 30 times of the LF/HF parameter may be compared with the predetermined threshold value, and then whether the patient Pa is stressed may be determined according to a result of the comparison.

In addition, the number of times of the comparison process between the LF/HF parameter and the predetermined threshold value is not particularly limited in the present embodiment. The LF/HF parameter and the predetermined threshold value may be compared for a plurality of times to comprehensively determine whether the patient Pa is stressed. For example, in the case where the LF/HF parameter is updated every 20 seconds in the measurement period of 10 minutes, the processes of steps S3 and S4 illustrated in FIG. 2 may be repeatedly executed every 20 seconds. That is, the comparison process of comparing the LF/HF parameter with the predetermined threshold value may be executed every 20 seconds.

In the case where the comparison process is executed every 20 seconds, the comparison process is executed 30 times during the measurement time of 10 minutes. For example, when the number of comparison results in which the LF/HF parameter is equal to or higher than the predetermined threshold value is larger than the number of comparison results in which the LF/HF parameter is smaller than the predetermined threshold value in the 30 times of the comparison processes, the control unit 20 may comprehensively determine that the patient Pa is stressed. On the other hand, when the number of comparison results in which the LF/HF parameter is equal to or higher than the predetermined threshold value is smaller than the number of comparison results in which the LF/HF parameter is smaller than the predetermined threshold value, the control unit 20 may comprehensively determine that the patient Pa is not stressed.

In this way, whether the patient Pa is stressed is comprehensively determined after the comparison process between the LF/HF parameter and the predetermined threshold value is executed for the plurality of times, and thus it is possible to determine whether the patient Pa is stressed with higher accuracy.

(Modification 1: Process of Generating Stress Information Based on Body Movement Data)

Figure 6:
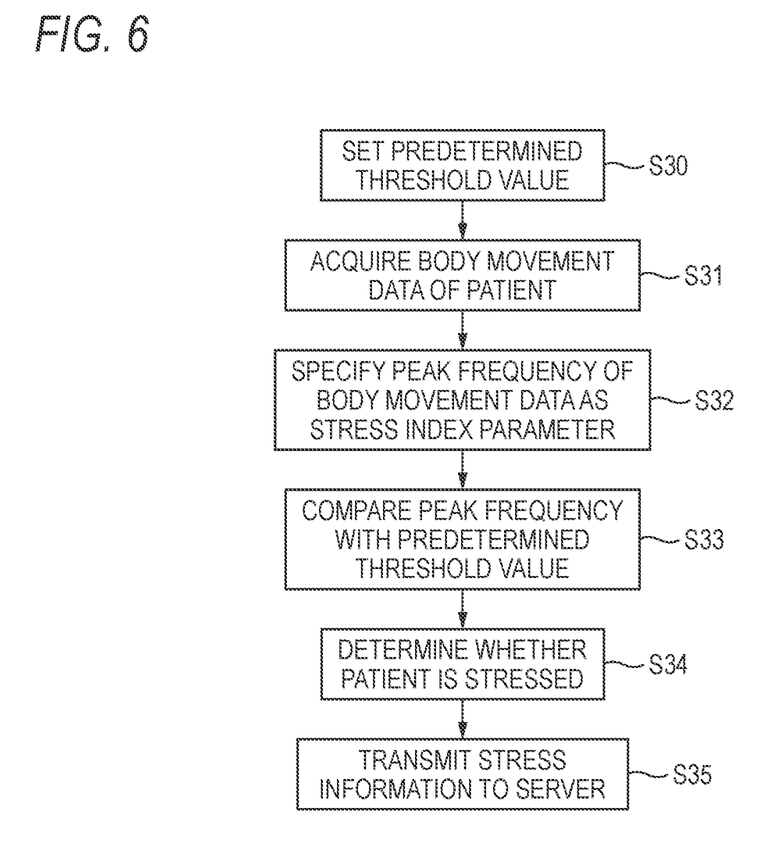
FIG. 6 is a flowchart illustrating a series of processes for generating the stress information of the patient from body movement data of the patient.

Next, a process of generating the stress information based on the body movement data of the patient Pa will be described below with reference to FIG. 6. FIG. 6 is a flowchart illustrating a series of processes for generating the stress information of the patient Pa from the body movement data of the patient Pa. In the above description of the embodiment, as illustrated in FIG. 3, the stress information of the patient is generated by using the pulse wave data of the patient. On the other hand, the series of processes illustrated in FIG. 6 generate the stress information of the patient by using the body movement data of the patient, which is different from the series of processes illustrated in FIG. 3. In addition, in the series of processes illustrated in FIG. 6, the body movement sensor 33 is used to obtain the stress information.

As illustrated in FIG. 6, in step S30, the control unit 20 of the processing device 2a sets a predetermined threshold value fth related to peak frequency fmax of the body movement data. Here, the predetermined threshold value fth is a value used as a comparison target when determining whether the patient Pa is stressed based on the peak frequency fmax of a power spectrum of the body movement data. Next, in step S31, the control unit 20 obtains the body movement data indicating movement of the body of the patient Pa from the body movement sensor 33.

In step S32, the control unit 20 specifies the peak frequency fmax of the body movement data as the stress index parameter. Specifically, the control unit 20 performs frequency analysis (for example, wavelet analysis, fast Fourier transform, or the like) on the body movement data so as to calculate the power spectrum of the body movement data. Thereafter, the control unit 20 specifies the peak frequency fmax corresponding to a peak value Pmax of the power spectrum of the body movement data.

In step S33, the control unit 20 compares the specified peak frequency fmax with the predetermined threshold value fth. Next, the control unit 20 determines whether the patient Pa is stressed in accordance with the comparison between the peak frequency fmax and the predetermined threshold value fth (step S34). In particular, the control unit 20 determines whether the patient Pa is stressed depending on whether the peak frequency fmax is equal to or higher than the predetermined threshold value fth. Here, when the patient is stressed, the body of the patient slightly vibrates due to fidgeting or the like, and thus the peak frequency fmax increases. On the other hand, when the patient is relaxed, the peak frequency fmax does not increase. In this way, when the peak frequency fmax is equal to or higher than the predetermined threshold value fth, the control unit 20 determines that the patient Pa is stressed. On the other hand, when the peak frequency fmax is smaller than the predetermined threshold value, the control unit 20 determines that the patient Pa is not stressed.

Thereafter, in step S35, the control unit 20 transmits the stress information on the stress state of the patient Pa to the server 4 via the in-hospital network 3. In this way, the stress information is generated based on the body movement data of the patient, and then the stress information is transmitted to the information terminal 8 associated with the doctor D via the server 4. Thereafter, the stress information is presented to the doctor D through the information terminal 8.

(Modification 2: Process of Generating Stress Information Based on Body Temperature Data)

Figure 7:
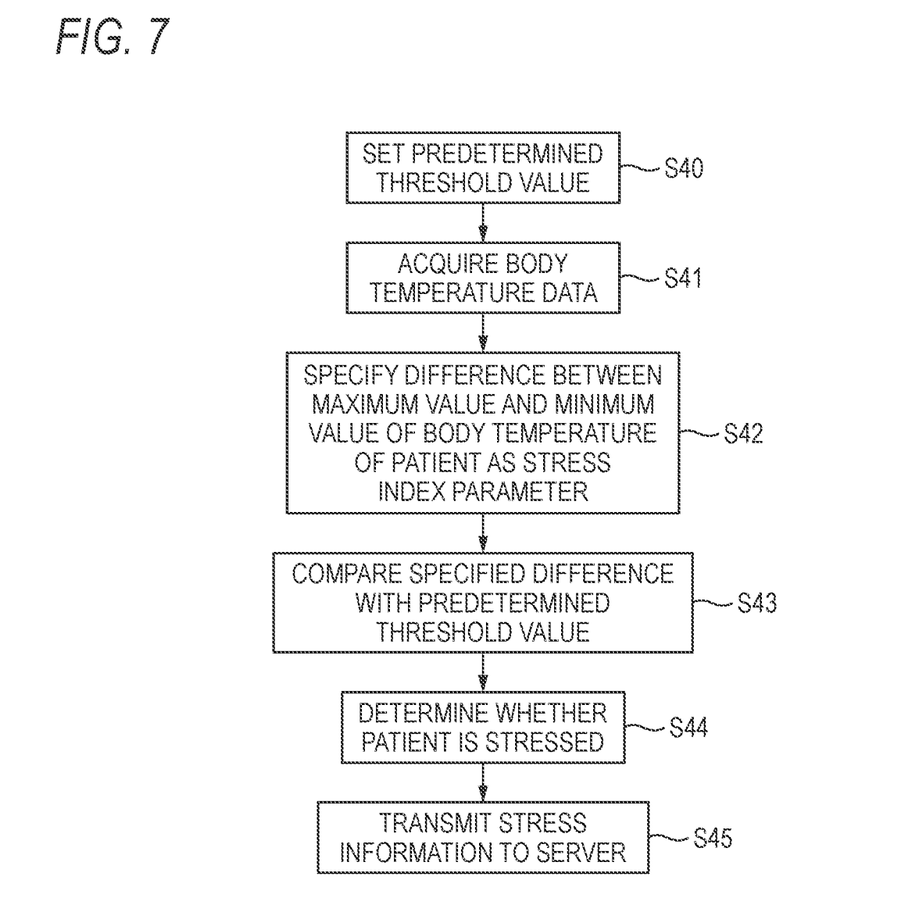
FIG. 7 is a flowchart illustrating a series of processes for generating the stress information of the patient from body temperature data of the patient.

Next, a process of generating the stress information based on the body temperature data of the patient Pa will be described below with reference to FIG. 7. FIG. 7 is a flowchart illustrating a series of processes for generating the stress information of the patient Pa from the body temperature data of the patient Pa. The series of processes illustrated in FIG. 7 generate the stress information of the patient by using the body temperature data of the patient, which is different from the series of processes illustrated in FIG. 3. In addition, in the series of processes illustrated in FIG. 7, the body temperature sensor 34 is used to obtain the stress information.

As illustrated in FIG. 7, in step S40, the control unit 20 of the processing device 2a sets a predetermined threshold value related to a difference ΔT between a maximum value Tmax and a minimum value Tmin of body temperature T of the patient Pa. Here, the predetermined threshold value is a value used as a comparison target when determining whether the patient Pa is stressed based on the difference ΔT. The control unit 20 may set a predetermined threshold value Tth based on the attribute information of the patient and/or external environmental temperature (for example, temperature in the hospital). Next, in step S41, the control unit 20 obtains the body temperature data indicating change over time in the body temperature T of the patient Pa from the body temperature sensor 34. In this regard, the body temperature sensor 34 may update the body temperature of the patient Pa at predetermined intervals (for example, intervals of one second).

In step S42, the control unit 20 specifies the difference ΔT between the maximum value Tmax and the minimum value Tmin of the body temperature of the patient Pa in a predetermined period as the stress index parameter. Next, in step S43, the control unit 20 compares the specified difference ΔT with the predetermined threshold value Tth. Next, the control unit 20 determines whether the patient Pa is stressed in accordance with the comparison between the difference ΔT and the predetermined threshold value Tth (step S44). In particular, the control unit 20 determines whether the patient Pa is stressed depending on whether the difference ΔT is equal to or higher than the predetermined threshold value Tth. Here, the difference ΔT between the maximum value and the minimum value of the body temperature of the patient tends to increase when the patient is stressed, whereas the difference ΔT tends to decrease when the patient is relaxed. In this way, when the difference ΔT is equal to or higher than the predetermined threshold value Tth, the control unit 20 determines that the patient Pa is stressed. On the other hand, when the difference ΔT is smaller than the predetermined threshold value Tth, the control unit 20 determines that the patient Pa is not stressed.

Thereafter, in step S45, the control unit 20 transmits the stress information on the stress state of the patient Pa to the server 4 via the in-hospital network 3. In this way, the stress information is generated based on the body temperature data of the patient, and then the stress information is transmitted to the information terminal 8 associated with the doctor D via the server 4. Thereafter, the stress information is presented to the doctor D through the information terminal 8.

In this example, the control unit 20 may also determine whether the patient Pa is stressed based on a comparison between an average value Tave of the body temperature T of the patient Pa and the predetermined threshold value. In this regard, when the patient is stressed, average body temperature of the patient tends to increase. As a specific operation, the control unit 20 specifies the average value Tave of the body temperature T of the patient Pa based on the body temperature data of the patient Pa obtained during the predetermined period. Thereafter, when the average value Tave is equal to or higher than the predetermined threshold value, the control unit 20 determines that the patient Pa is stressed. On the other hand, when the average value Tave is smaller than the predetermined threshold value, the control unit 20 determines that the patient Pa is not stressed.

(Modification 3: Process of Generating Stress Information Based on Skin Potential Data)

Figure 8:
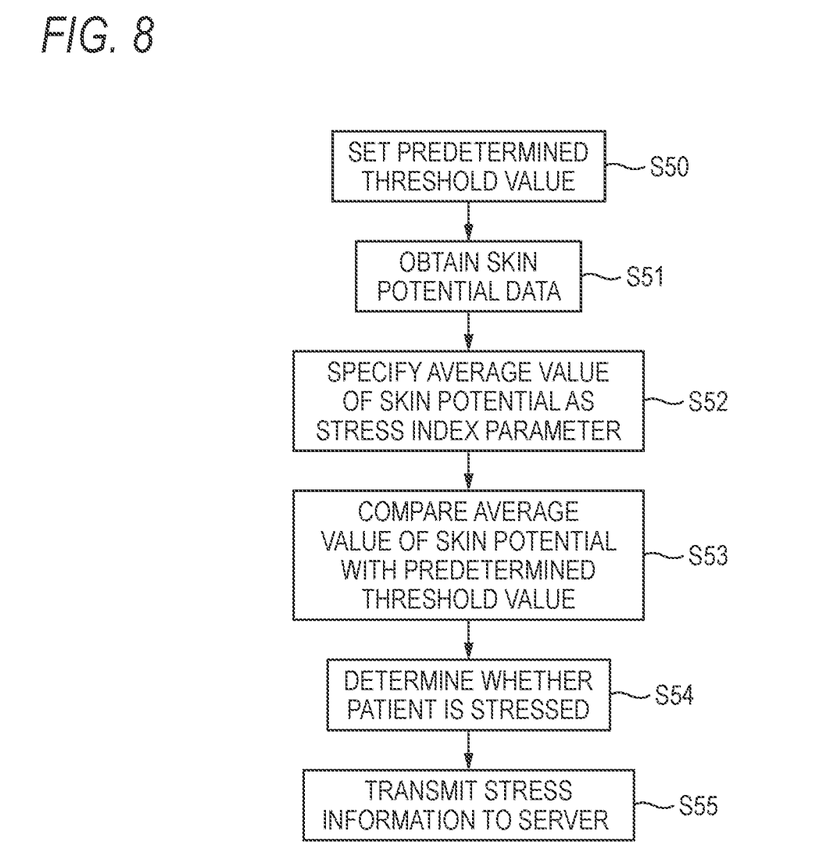
FIG. 8 is a flowchart illustrating a series of processes for generating the stress information of the patient from skin potential data of the patient.

Next, a process of generating the stress information based on the skin potential data of the patient Pa will be described below with reference to FIG. 8. FIG. 8 is a flowchart illustrating a series of processes for generating the stress information of the patient Pa from the skin potential data of the patient Pa. The series of processes illustrated in FIG. 8 generate the stress information of the patient by using the skin potential data of the patient, which is different from the series of processes illustrated in FIG. 3. In addition, in the series of processes illustrated in FIG. 8, the skin potential sensor 35 is used to obtain the stress information.

As illustrated in FIG. 8, in step S50, the control unit 20 of the processing device 2a sets a predetermined threshold value Vth related to an average value Vave of a skin potential of the patient Pa. Here, the predetermined threshold value Vth is a value used as a comparison target when determining whether the patient Pa is stressed based on the average value Vave of the skin potential. The control unit 20 may set the predetermined threshold value Vth based on the attribute information of the patient. Next, in step S51, the control unit 20 obtains the skin potential data indicating change over time in the skin potential of the patient Pa from the skin potential sensor 35. In this regard, the skin potential sensor 35 may update the skin potential of the patient Pa at a predetermined cycle.

In step S52, the control unit 20 specifies the average value Vave of the skin potential during a predetermined time period as the stress index parameter. Next, in step S53, the control unit 20 compares the specified average value Vave of the skin potential with the predetermined threshold value Vth. Next, the control unit 20 determines whether the patient Pa is stressed based on the comparison between the average value Vave and the predetermined threshold value Vth (step S54). In particular, the control unit 20 determines whether the patient Pa is stressed depending on whether the average value Vave is equal to or higher than the predetermined threshold value Vth. Here, an average skin potential of the patient tends to be low when the patient is stressed, whereas the average skin potential tends to be large when the patient is relaxed. In particular, when the patient is tensed due to stress, perspiration of the patient becomes active, and thus the average skin potential tends to decrease. In this way, when the average value Vave of the skin potential is equal to or less than the predetermined threshold value Vth, the control unit 20 determines that the patient Pa is stressed. On the other hand, when the average value Vave of the skin potential is greater than the predetermined threshold value Vth, the control unit 20 determines that the patient Pa is not stressed.

Thereafter, in step S55, the control unit 20 transmits the stress information on the stress state of the patient Pa to the server 4 via the in-hospital network 3. In this way, the stress information is generated based on the skin potential data of the patient, and then the stress information is transmitted to the information terminal 8 associated with the doctor D via the server 4. Thereafter, the stress information is presented to the doctor D through the information terminal 8.

Although the method of generating the stress information of the patient based on any one of the pulse wave data, the body movement data, the body temperature data, and the skin potential data has been described in the present embodiment, the present embodiment is not limited thereto. For example, the stress information of the patient may be generated based on at least two of the pulse wave data, the body movement data, the body temperature data, and the skin potential data. In particular, the stress information of the patient may be generated based on a combination of the pulse wave data, the body movement data, the body temperature data, and the skin potential data.

For example, as illustrated in Table 1 below, it is assumed that the patient is determined to be stressed based on a result of stress determination using the pulse wave data, whereas the patient is determined to be not stressed based on a result of stress determination using the body movement data, the body temperature data, and the skin potential data. In such a case, the control unit 20 may comprehensively determine that the patient is not stressed.

TABLE 1 an example of results of stress determination based on each type of physiological information data

| PHYSIOLOGICAL INFORMATION DATA THAT IS USED | STRESS DETERMINATION RESULT |
|---|---|
| PULSE WAVE DATA | o (STRESSED) |
| BODY MOVEMENT DATA | x (NOT STRESSED) |
| BODY TEMPERATURE DATA | x |
| SKIN POTENTIAL DATA | x |

In this way, when the stress information of the patient is generated based on at least two of the pulse wave data, the body movement data, the body temperature data, and the skin potential data, whether the patient is stressed can be comprehensively determined from multiple perspectives, and thus it is possible to accurately determine whether the patient is stressed.

In addition, in order to implement various processes executed by the processing device 2 by software, the physiological information processing program may be incorporated in the storage device 21 or the ROM in advance. Alternatively, the physiological information processing program may be stored in a computer-readable storage medium such as a magnetic disk (for example, an HDD or a floppy disk), an optical disk (for example, a CD-ROM, a DVD-ROM, or a Blu-ray (registered trademark) disk), a magneto-optical disk (for example, an MO), or a flash memory (for example, an SD card, a USB memory, or an SSD). In this case, the physiological information processing program stored in the storage medium may be incorporated into the storage device 21. The physiological information processing program incorporated in the storage device 21 is loaded onto the RAM, and then the one or more processors may execute the physiological information processing program loaded onto the RAM.

In addition, the physiological information processing program may be downloaded from a server on a communication network such as the Internet. In this case as well, the downloaded program may be incorporated into the storage device 21.

According to the embodiments, it is possible to provide the physiological information processing method, the physiological information processing device, and the physiological information processing system capable of grasping in advance that the subject is stressed before an examination.

Although the embodiment of the presently disclosed subject matter has been described above, the technical scope of the presently disclosed subject matter should not be construed as being limited by the description of the embodiment. It is to be understood by those skilled in the art that the present embodiment is an example and various modifications can be made within the scope of the invention described in the claims. The technical scope of the presently disclosed subject matter should be determined based on the scope of the invention described in the claims and the scope of equivalents thereof.

The invention claimed is:

1. A physiological information processing method executed by a computer, comprising:
   obtaining a stress index parameter indicating a stress index of a subject based on physiological information data of the subject from at least one physiological information sensor;
   comparing the stress index parameter with a predetermined threshold value;
   determining that the subject is stressed in accordance with the comparison between the stress index parameter and the predetermined threshold value;
   transmitting stress information indicating that the subject is stressed to a remote server;
   outputting the stress information from the remote server indicating that the subject is stressed to an information terminal comprising one or more processors, through an in-hospital network,
   wherein the information terminal is associated with a medical worker who is charged with examination of the subject.

2. The physiological information processing method according to claim 1, wherein the outputting includes transmitting the stress information to the remote server provided in the in-hospital network through a wireless communication module.

3. The physiological information processing method according to claim 1, further comprising:
   the information terminal is configured to present the stress information to the medical worker visually, audibly, or tactually.

4. The physiological information processing method according to claim 1, further comprising:
   setting the predetermined threshold value based on attribute information of the subject.

5. The physiological information processing method according to claim 1, further comprising:
   setting, as the predetermined threshold value, a value of the stress index parameter of the subject obtained during a previous hospital visit.

6. The physiological information processing method according to claim 1, wherein the obtaining includes obtaining a plurality of stress index parameters,
   the comparing includes comparing each of the plurality of stress index parameters with the predetermined threshold value, and
   the determining includes determining that the subject is stressed in accordance with the comparison between each of the plurality of stress index parameters and the predetermined threshold value.

7. The physiological information processing method according to claim 1, wherein the physiological information data includes pulse wave data indicating change over time in a pulse wave of the subject,
   the stress index parameter is an autonomic nervous parameter related to an autonomic nerve of the subject, and
   the autonomic nervous parameter is based on the pulse wave data.

8. The physiological information processing method according to claim 7, wherein the obtaining the autonomic nervous parameter includes:

obtaining, from the pulse wave data, pulse wave interval data indicating an interval between pulse waves adjacent to each other in time;

obtaining an LF parameter related to a low frequency component of the pulse wave interval data and an HF parameter related to a high frequency component of the pulse wave interval data by performing frequency analysis on the pulse wave interval data; and obtaining an LF/HF parameter as the autonomic nervous parameter based on the LF parameter and the HF parameter.

9. The physiological information processing method according to claim 1, wherein the physiological information data includes body movement data indicating movement of a body of the subject, the stress index parameter is a peak frequency corresponding to a peak value of a spectrum of the body movement data, and the peak frequency is obtained by performing frequency analysis on the body movement data.

10. The physiological information processing method according to claim 1, wherein the physiological information data includes body temperature data indicating change over time in body temperature of the subject, and the stress index parameter is a difference between a maximum value and a minimum value of the body temperature of the subject or an average value of the body temperature of the subject.

11. The physiological information processing method according to claim 1, wherein the physiological information data includes skin potential data indicating change over time in a skin potential of the subject, and the stress index parameter is an average value of the skin potential within a predetermined time.

12. The physiological information processing method according to claim 1, wherein the information terminal is configured to present the stress information to the medical worker tactually.

13. A computer-readable non-transitory storage medium storing a program for causing a computer to execute the physiological processing method according to claim 1.

14. A physiological information processing system comprising:

a physiological information processing device that comprises at least one physiological information sensor and that is configured to be attached to a subject and configured to obtain physiological information data of the subject;

a remote server communicably connected to the physiological information processing device and an in-hospital network; and an information terminal that comprises one or more processors, is communicably connected to the remote server, and is associated with a medical worker who is charged with examining the subject, wherein the physiological information processing device is configured to:

obtain a stress index parameter indicating a stress index of the subject based on the physiological information data of the subject from the at least one physiological information sensor;

compare the stress index parameter with a predetermined threshold value;

determine that the subject is stressed in accordance with the comparison between the stress index parameter and the predetermined threshold value;

transmit the stress information to the information terminal via the remote server and the in-hospital network; and present the stress information to the medical worker visually, audibly, or tactually.

15. The physiological information processing system according to claim 14, wherein the information terminal is configured to present the stress information to the medical worker tactually.

16. A physiological information processing device configured to be attached to a subject, comprising:

one or more processors;

one or more memories configured to store a computer readable instruction; and a wireless communication module comprising a radio frequency (RF) circuit and a transmission and reception antenna, wherein when the computer readable instruction is executed by the one or more processors, the physiological information processing device is configured to:

obtain a stress index parameter indicating a stress index of the subject based on the physiological information data of the subject from at least one physiological information sensor;

compare the stress index parameter with a predetermined threshold value;

determine that the subject is stressed in accordance with the comparison between the stress index parameter and the predetermined threshold value; and transmit the stress information to an information terminal via a remote server and an in-hospital network, the information terminal comprising one or more processors and associated with a medical worker charged with examining the subject through the wireless communication module.

17. The physiological information processing device according to claim 16, wherein the information terminal is configured to present the stress information to the medical worker tactually.

* * * * *